United States Patent
Onodera

(10) Patent No.: US 7,200,361 B2
(45) Date of Patent: Apr. 3, 2007

(54) WIRELESS COMMUNICATION APPARATUS, WIRELESS COMMUNICATION METHOD AND WIRELESS COMMUNICATION MEDIA

(75) Inventor: Shin Onodera, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 150 days.

(21) Appl. No.: 10/954,608

(22) Filed: Oct. 1, 2004

(65) Prior Publication Data

US 2005/0090281 A1    Apr. 28, 2005

(30) Foreign Application Priority Data

Oct. 3, 2003    (JP)    ............................. 2003-345819

(51) Int. Cl.
*H04B 5/00* (2006.01)

(52) U.S. Cl. ..................... 455/41.1; 455/558; 455/517; 340/10.51; 340/10.1

(58) Field of Classification Search ............ 455/412.1, 455/41.1, 41.2, 41.3, 517, 67.14, 550.1, 556.1, 455/558; 340/5.6, 5.61, 10.1, 10.3, 10.34, 340/10.4, 10.51, 5.64; 235/384, 380
See application file for complete search history.

(56) References Cited

U.S. PATENT DOCUMENTS

| | | | | |
|---|---|---|---|---|
| 5,354,975 A * | 10/1994 | Ishibashi et al. | ............. | 235/380 |
| 5,796,092 A * | 8/1998 | Nagata et al. | ............... | 235/492 |
| 5,831,547 A * | 11/1998 | Ohtsuki et al. | .......... | 340/10.41 |
| 7,009,496 B2 * | 3/2006 | Arneson et al. | ............ | 340/10.2 |
| 2005/0170793 A1 * | 8/2005 | Nakagawa | ................... | 455/116 |
| 2005/0252979 A1 * | 11/2005 | Konuma et al. | ............ | 235/492 |
| 2006/0050877 A1 * | 3/2006 | Nakamura | .................... | 380/46 |
| 2006/0082458 A1 * | 4/2006 | Shanks et al. | ........... | 340/572.4 |

FOREIGN PATENT DOCUMENTS

| | | |
|---|---|---|
| JP | 2000-36017 | 2/2000 |
| JP | 2000-36017 A | 2/2000 |

OTHER PUBLICATIONS

European Search Report dated Jan. 31, 2005 for Appln. No. EP 0402 2206.
Rankl W Ed, Rankl W. et al.; "Smart Card Handbook," John Wiley & Sons (2000); pp. 172-198, first published as "Handbuch der Chipkarten," 1999, pp. 222-249. ISBN: 3-446-2115-2.
"Handbuch der Chipkarten," 1999, pp. 222-249. ISBN: 3-446-2115-2.

* cited by examiner

*Primary Examiner*—Duc M Nguyen
*Assistant Examiner*—Anthony S. Addy
(74) *Attorney, Agent, or Firm*—Pillsbury Winthrop Shaw Pittman, LLP

(57) ABSTRACT

A wireless communication apparatus includes a transmitter to transmit a response request signal, a receiver to receives a response transmitted from a wireless communication medium in response to the response request signal, a level detector to detect a response receiving signal level, a memory to store threshold signal level of receiving signal of each type of medium; and a controller to set up a threshold signal level enabling the data writing to a medium to which a response is transmitted based on medium type data included in a response and a threshold signal level of a receiving signal of each type of stored medium, and starts the data writing to a medium to which a response is transmitted when a response receiving signal level is above the threshold signal level.

7 Claims, 5 Drawing Sheets

| WIRELESS IC CARD MAKER | READ (V) | WRITE (V) |
|---|---|---|
| A COMPANY | 3 | 5 |
| B COMPANY | 4 | 6 |
| C COMPANY | 2 | 5 |

FIG. 6

WIRELESS COMMUNICATION APPARATUS, WIRELESS COMMUNICATION METHOD AND WIRELESS COMMUNICATION MEDIA

CROSS-REFERENCE TO RELATED APPLICATION

This application is based upon and claims the benefit of priority from the prior Japanese Patent Application No. 2003-345819, filed Oct. 3, 2003, the entire contents of all of which are incorporated herein by reference.

BACKGROUND OF THE INVENTION

1. Field of the Invention

The present invention relates to a wireless communication apparatus for communicating with wireless communication media (wireless IC cards) and a wireless communication method that is applicable to the wireless communication with wireless communication media (wireless IC cards).

2. Description of the Invention

In recent years, from the aspect of safety of data and convenience in carrying, non-contact usable wireless IC cards are in widespread use and various proposals are made relative to the non-contact data or data transmission/receiving such as disclosed in, for example, Japanese Published Patent Application No. 2000-36017.

For example, a wireless IC card is used as a railway ticket. At railway stations, automatic ticket gates are introduced for the purpose of labor saving. So far, an automatic ticket gate receives such magnetic tickets as admission tickets, prepaid cards, commutation tickets, ordinary railway tickets etc. and examines by reading boarding data recorded on the tickets. In recent years, however, it becomes possible for automatic ticket gates to perform the gate processing based on wireless IC cards instead of the above-mentioned magnetic tickets.

However, a wireless IC card is manufactured by many makers and a wireless card reader/writer should be capable of communicating with various wireless IC cards having different communication performances manufactured by various makers.

For example, the communication ranges in which wireless IC cards are able to stably communicate differ for every wireless IC card manufacturing makers. Therefore, it was necessitated to set a communication range wherein wireless card reader/write is enabled to make the communication with IC cards of which the communication ranges are most narrow. Thus, even wireless IC cards having a relatively wide communication range could not receive its benefit.

SUMMARY OF THE INVENTION

An object of the present invention is to provide a wireless communication apparatus capable of making the wireless communication effectively utilizing performances of wireless communication media having different communication performances manufactured by various makers and a wireless communication method. Further, it is also an object to provide a wireless communication medium to which this wireless communication method is applicable.

According to the present invention, there is provided a wireless communication apparatus comprising transmitting means for transmitting a response requesting signal to a wireless communication medium for requesting a response including medium type data showing type of wireless communication media; receiving means for receiving a response transmitted from the wireless communication medium in response to the response requesting signal transmitted by the transmitting means; detecting means for detecting the response receiving signal level; storage means for storing plural threshold signal levels of receiving signals for each type of media correlated with the medium type data showing type of wireless communication media; reading means for reading the threshold signal levels from the storage means based on the medium type data showing type of wireless communication media included in the response received by the receiving means; comparing means for comparing the receiving signal level of the response detected by the detecting means with the threshold signal level that is read by the reading means; and control means for starting the writing of specified data to the wireless communication medium to which the response is transmitted when the receiving signal level is larger than the threshold signal level by the comparing means.

Further, according to the present invention, there is provided a wireless communication method comprising transmitting a response requesting signal to a wireless communication medium for requesting a response including medium type data showing type of wireless communication media; receiving a response transmitted from the wireless communication medium in response to the response requesting signal; detecting the response receiving signal level; storing plural threshold signal levels of receiving signals for each type of media correlated with the medium type data showing type of wireless communication media in a storage means; reading the threshold signal levels from the storage means based on the medium type data showing type of wireless communication media included in the response; comparing the response receiving signal level with the threshold signal level; and starting the writing of specified data to the wireless communication medium to which the response is transmitted when the receiving signal level is larger than the threshold signal level determined by the comparison.

Further, according to the present invention, there is provided a wireless communication medium capable of wireless communication with the wireless communication apparatus, comprising storage means for storing medium type data showing type of this medium; receiving means for receiving a response request signal to request a response transmitted from the wireless communication apparatus; and transmitting means for transmitting a response including the medium type data stored in the storage means to the wireless communication apparatus in response to the response request signal.

BRIEF DESCRIPTION OF THE DRAWINGS

FIG. 6 is a table showing samples of read/write signals for three wireless IC card makers.

DETAILED DESCRIPTION OF THE INVENTION

Figure 1:
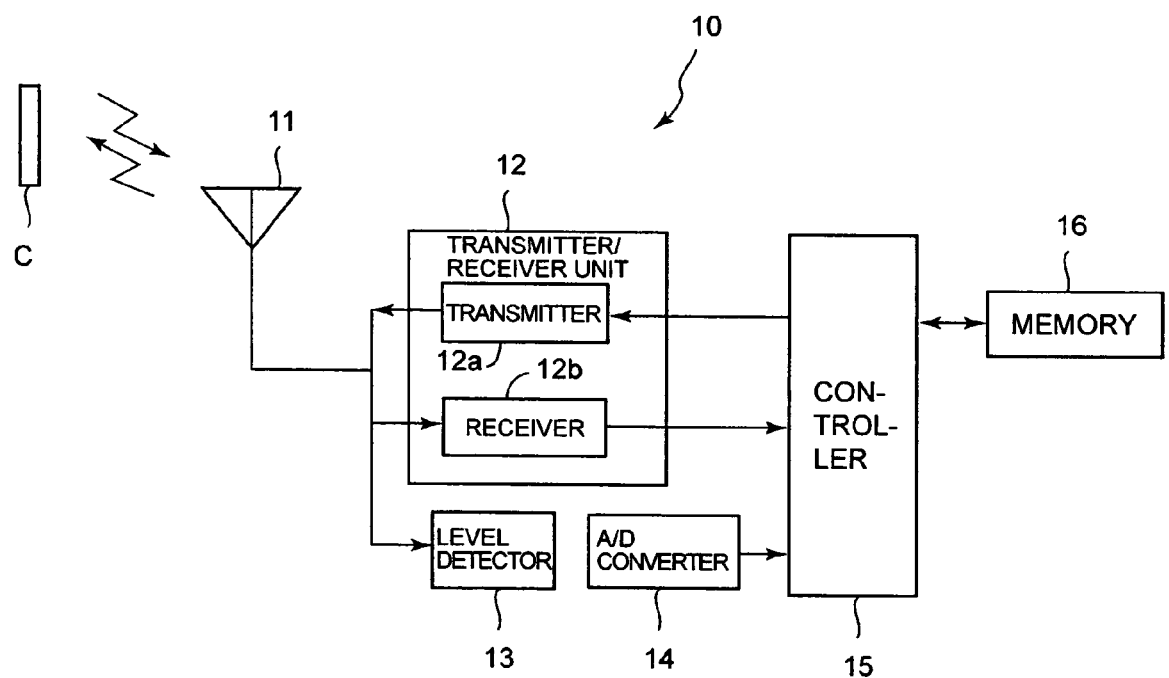
FIG. 1 is a block diagram showing the schematic construction of a wireless IC card reader/writer (a wireless communication equipment) involved in an embodiment of the present invention.

FIG. 1 is a block diagram showing the schematic construction of a wireless IC card reader/writer (a wireless communication equipment) involved in an embodiment of the present invention. As shown in FIG. 1, a wireless IC card reader/writer 10 is provided with an antenna 11, a transmitter/receiver unit 12, a level detector 13, an A/D converter 14, a controller 15, and a memory 16. Further, transmitter/receiver unit 12 is provided with a transmitter 12a and a receiver 12b.

Antenna 11 transmits/receives radio wave to/from a wireless IC card C. Transmitter 12a modulates signals that are sent to wireless IC card C under the control of controller 15 and supplies modulated signals to antenna 11. Receiver 12b demodulates signals received through antenna 11 and supplies to controller 15. Level detector 13 detects a signal level of the received signal. The result of detection by level detector 13, for example, a signal level of the received signal is A/D converted by A/D converter 14 and supplied to controller 15.

Memory 16 stores card type data showing the type of wireless IC card C and communication performance data showing the communication performance corresponding to the card type data. As card type data showing the type of wireless IC card, there are, for example, manufacturing maker codes and manufacturing codes. As communication performance data showing communication performance, there is a threshold signal level showing a lower limit of the received signal level (a signal level when a signal sent from a wireless IC card was received). That is, memory 16 stores received signal levels that are minimum necessary for each type of wireless IC card C. As shown in the table in FIG. 6, for example, there are A, B, and C companies as wireless IC card makers. A read signal level of the wireless IC card manufactured by A Company is 3V and a write signal level is 5V. A read signal level of the wireless IC card manufactured by B Company is 4V and a write signal level is 6V. A read signal level of the wireless IC card manufactured by C Company is 2V and a write signal level is 5V. The table shown in FIG. 6 is stored in memory 16 as the communication performance data showing the communication performance corresponding to the card type data.

Figure 2:
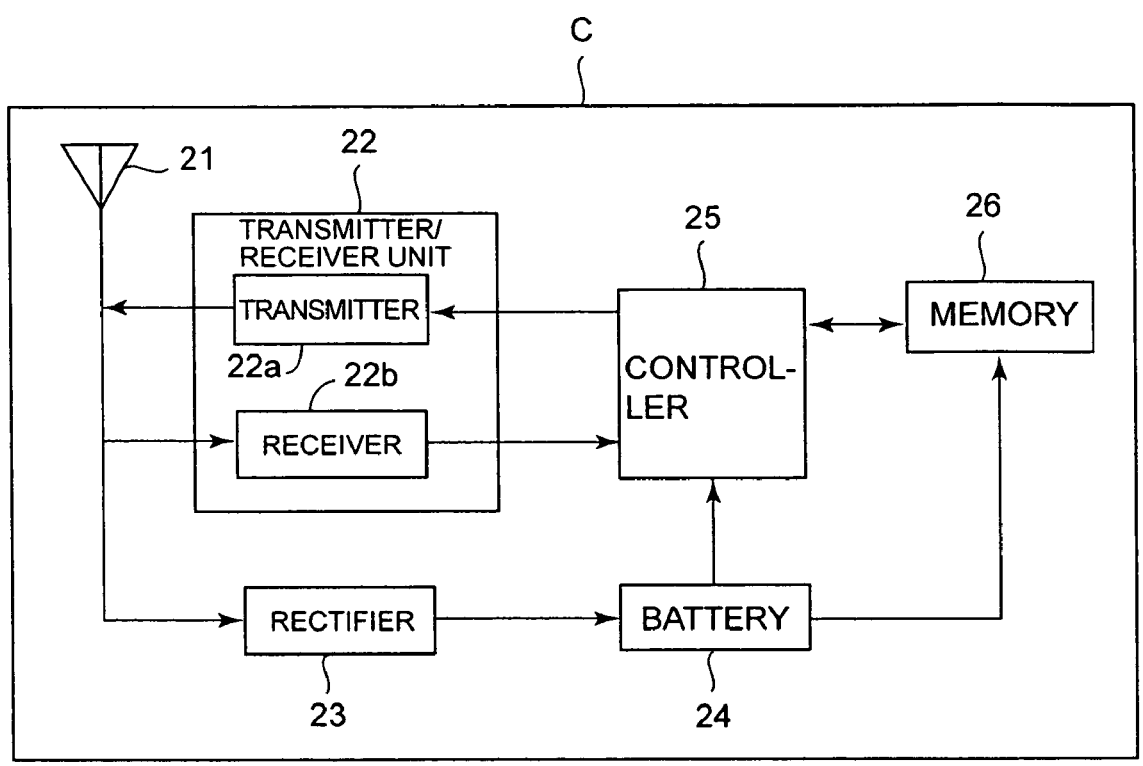
FIG. 2 is a block diagram showing the schematic construction of a wireless IC card (a wireless communication medium) involved in an embodiment of the present invention.

FIG. 2 is a block diagram showing the schematic construction of a wireless IC card (a wireless communication medium) involved in an embodiment of the present invention. As shown in FIG. 2, wireless IC card C is provided with an antenna 21, a transmitter/receiver 22, a rectifier 23, a battery 24, a controller 25, and a memory 26.

Antenna 21 transmits/receives to/from wireless IC card reader/writer. A transmitter 22a modulates signals that are transmitted to wireless IC card reader/writer 10 under the control of controller 25 and supplies this modulated transmission signal to antenna 21. A receiver 22b demodulates the signal received through antenna 21 and supplies this demodulated received signal to controller 25. Rectifier 23 rectifies the charging radio wave received through antenna 21 and by converting into electric energy, supplies this electric energy to battery 24. Battery 24 accumulates the electric energy sent from rectifier 23 and supplies an operating power to each portion of the card. Memory 26 stores data showing the type of this wireless IC cards as the type data showing wireless IC card C, there are manufacturing maker codes and manufacturing codes.

Wireless IC card reader/writer 10 communicates with wireless IC card C according to a communication system called "polling." First, controller 15 of wireless IC card reader/writer 10 transmits a response requesting signal (polling), which requests a response, to wireless IC card C through transmitter 12a and antenna 11. Wireless IC card C receives the response requesting signal (polling) from wireless IC card reader/writer 10 through antenna 21, and generates electric power from this response requesting signal using rectifier 23. The generated power is accumulated in battery 24 and the power accumulated in battery 24 is supplied to each unit. Further, wireless IC card C returns a response to wireless IC card reader/writer 10 in response to the received response request signal (polling). In this response, card type data showing the type of this wireless IC card C stored in memory 26 of wireless IC card, for example, the name of the manufacturer of wireless IC card, is contained. Wireless IC card reader/writer 10 receives a response transmitted from wireless IC card C through antenna 11 and receiver 12b, confirms a specified wireless IC card C and performs a series of actual data transmission/receiving with the specified wireless IC card C.

Figure 3:
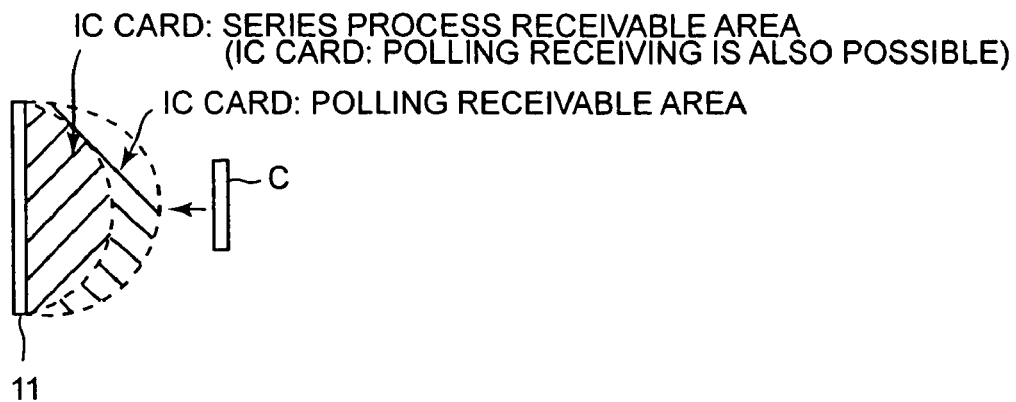
FIG. 3 is a schematic diagram for explaining a difference between a poling receivable range by a wireless IC card C and a series process receivable range.

Should be noted that the area capable of polling receiving by wireless IC card C differs from the area capable of series process receiving, as shown in FIG. 3. That is, the communication distance enabling generation of electric power by wireless IC card C using polling communication differs from the communication distance that enables the writing of data into wireless IC card C, and even when generation of electric power is enabled, data may not be written actually. Further, in the polling receiving-only enable area, only polling receiving is possible and actual data writing is not possible. However, it is enabled to actually write data in the area wherein series process receiving is possible and polling receiving is also possible.

Further, the polling receivable area and the series process receivable area are non-uniform depending on the type of wireless IC card C. For example, in the case of a wireless IC card C of one maker, the polling cannot be received unless the card is brought sufficiently close to the antenna of the wireless IC card reader/writer. In case of another wireless IC card C of another maker, a response to the polling cannot be returned sufficiently to the polling unless the wireless IC card C is brought sufficiently to the antenna of the wireless IC card reader/writer. In case of another wireless IC card C of another maker, the polling can be received even when relatively far away from the antenna of the wireless IC card C. In case of another wireless IC card C of another maker, a response to the polling can be returned even when relatively far away from the antenna of the wireless IC card reader/writer.

Further, in case of a wireless IC card C of one maker, data can not be written unless the card is brought sufficiently close to the antenna of the wireless IC card reader/writer and electric power of about 5V is generated from the received signal; in case of a wireless IC card C of another maker, data can be written when the card is relatively far away from the antenna of the wireless IC card reader/writer and electric power of about 3V is generated.

As described above, the transmission capacity and receiving capacity differ according to the type of wireless IC card C and the communication range (electric power demanded for writing), wherein the wireless IC card C is enabled to communicate stably, differs for each wireless IC card manufacturer. Therefore, it had been necessary for the wireless IC card reader/writer to set the communication range so as to enable communication with the wireless IC card C having the most narrow communication range (wireless IC card C demanding large electric power in the data writing). However, as a result, a wireless IC card having a relatively wide communication range (wireless IC card demanding small electric power in the data writing) will lose its benefit.

So, in the present invention, memory 16 of wireless IC card reader/writer 10 stores card type data showing the type of wireless IC card C and communication performance data showing the communication performance corresponding to the card type data. Based on the card type data contained in a response from wireless IC card C, the communication performance of this wireless IC card is determined and the communication range corresponding to the communication performance of this wireless IC card C is set. Thus, the optimum communication corresponding to the communication performance of this wireless IC card C is enabled.

That is, as shown in the table in FIG. 6, as card type data contained in the response from the wireless IC card C, a voltage value needed to read/write corresponding to the manufacturer name of that card is stored in memory 16 of wireless IC card reader/writer 10. Thus, when the communication range corresponding to the communication performance of wireless IC card C is set by wireless IC card reader/writer 10, the optimum communication corresponding to the communication performance of this wireless IC card C is enabled.

Next, the wireless communication with wireless IC card reader/writer and wireless IC card C described above, (in other words, the communication control according to the type of card; that is, according to the communication performance corresponding to the manufacturer of wireless IC card C) will be explained referring to the flowchart shown in FIG. 4 and the timing chart shown in FIG. 5.

Figure 4:
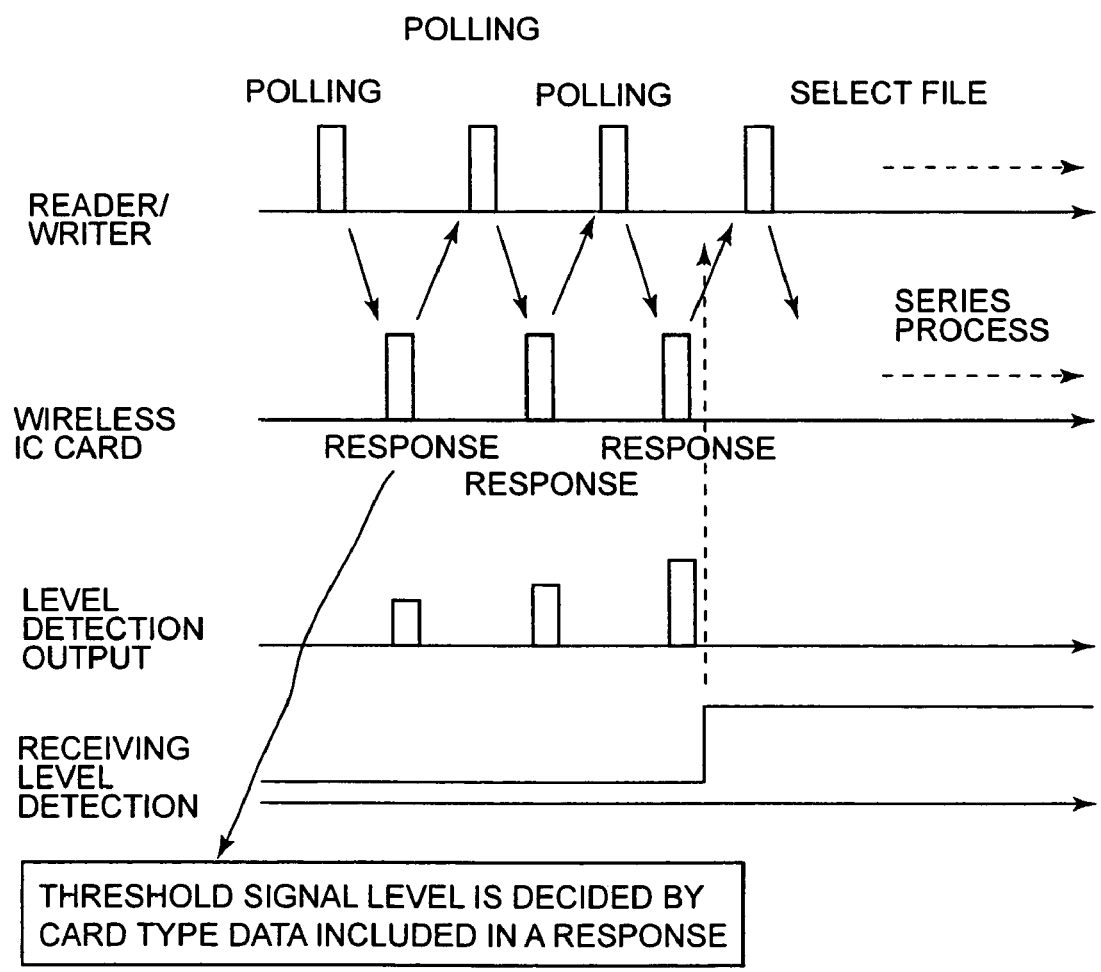
FIG. 4 is a timing chart for explaining the wireless communication process between a wireless IC card reader/writer and a wireless IC card.
Figure 5:
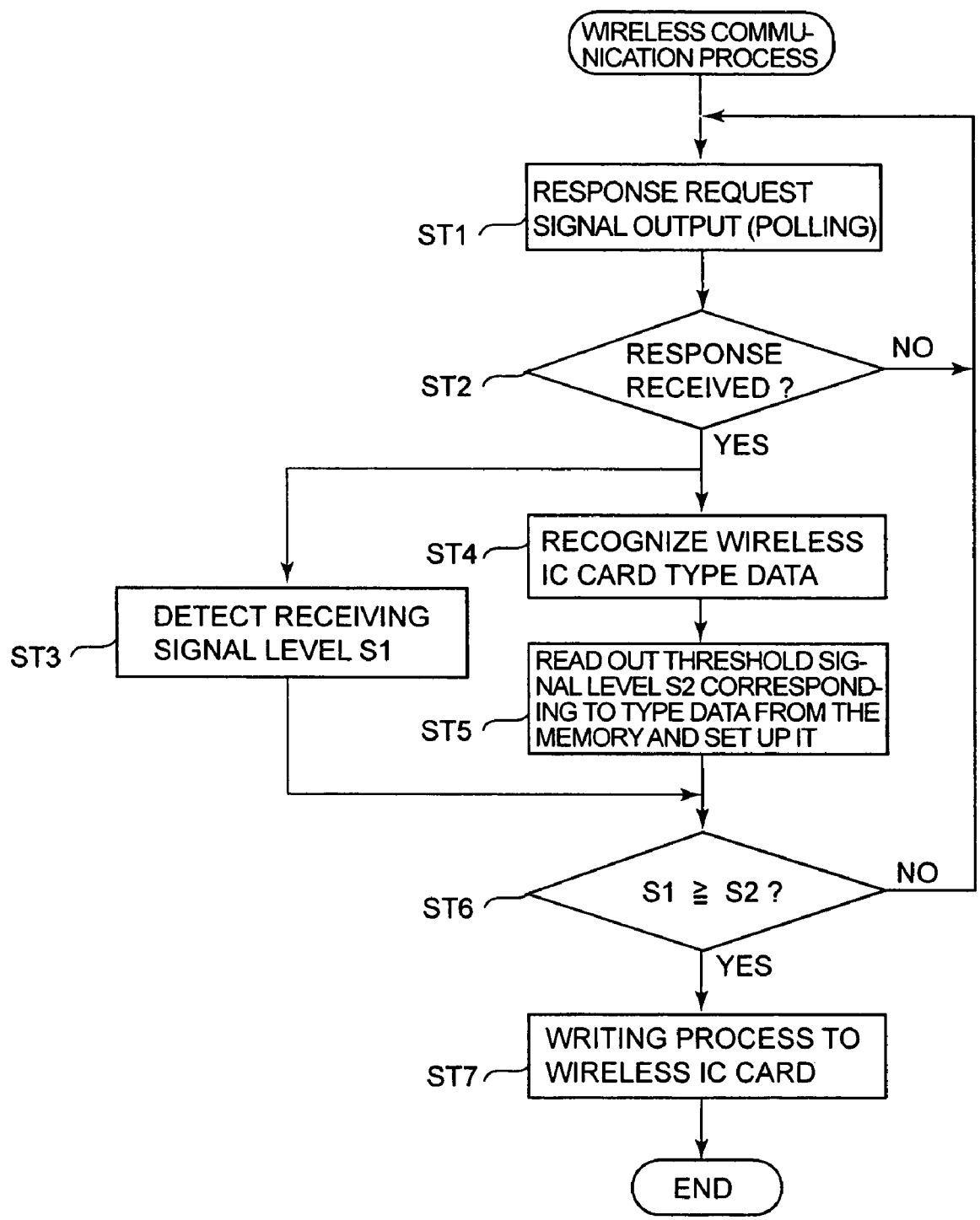
FIG. 5 is a flowchart for explaining the wireless communication process between a wireless IC card reader/writer and a wireless IC card.

As shown in FIG. 4 and FIG. 5, for communication with wireless IC card C through transmitter 12a and antenna 11, wireless IC card reader/writer 10 transmits a response requesting signal (polling) to request a response, repeatedly (ST1). When a response signal (polling) transmitted from wireless IC card reader/writer 10 through antenna 21 and receiver 22b, wireless IC card C returns a response containing the manufacturer code indicating the maker of the wireless IC card C as the card type data showing own card type.

When a response is transmitted from wireless IC card C through antenna 11 and receiver 12b (ST2, YES), wireless IC card reader/writer 10 detects the receiving signal level S1 of the response received by level detector 13 (ST3). At the same time, controller 15 recognizes the card type data contained in the received response (ST4). Then, the card type data stored in memory 16 is read out; that is, the threshold signal level correlated with each card maker sets the threshold signal level S2 that is capable of writing data to wireless IC card, which has transmit a response above this threshold signal level (ST5).

For example, when the maker name of wireless IC card C is A Company, the signal level required for its reading is 3V and the signal level required for the writing is 5V as shown in the table of FIG. 6. Therefore, a threshold signal level S2 corresponding to these values is set.

When the maker name of wireless IC card C is B company, the signal level required for its reading is 4V and the signal level required for the writing is 6V and a threshold signal level S2 is set corresponding to these values.

When the maker name of wireless IC card C is C Company, the signal level required for its reading is 2V, and a signal level required for the writing is 5V, and the threshold signal level S2 is set.

Further, controller 15 compares the set threshold signal level S2 with the receiving signal level S1 of a response from actual wireless IC card C (ST6). When the receiving signal level 51 of the response from wireless IC card C is less than the threshold signal level S2 (ST6, NO) as a result of the comparison, a response requesting signal (polling) is transmitted without shifting to the actual process (data writing, etc.) (ST1) and it is waited until the receiving signal level of a received response (ST2) becomes above the threshold signal level (ST6, YES). When the receiving signal level S1 of the response from wireless IC card C is above the threshold signal level S2 as a result of the comparison (ST6, YES), the actual processing is started. That is, the data writing, etc. to wireless IC card C is started (ST7).

As explained above, according to the present invention, when wireless IC card is brought to a distance close to wireless IC card reader/writer so that actual process such as data writing, etc. can be made stably, the writing is started and therefore, it becomes possible to stabilize the communication. Further, even when the distance to make the writing varies depends on the card maker, card model number, etc., a threshold signal level is decided based on the card type data retained in the wireless IC card and the actual process is started by checking whether this threshold signal level is cleared. Therefore, the communication at a communication distance suited to each card becomes possible. Further, it is possible to know the behavior of the wireless IC card as to whether it is closing to or getting away from wireless IC card reader/writer by monitoring the received level of the signal transmitted from wireless IC card. Therefore, when the wireless IC card is far away from the wireless IC card reader/writer, it is possible to stabilize the communication through such actions such as interruption of the communication.

Further, the present invention is not limited to the embodiment described above but can be modified variously within the scope departing from the spirit and scope thereof in the embodiments. Further, the embodiments described above may be combined as appropriate to the extent possible and in this case, combined effects are obtained. Further, inventions at various states are included in the above-mentioned embodiments and various inventions are derived through combination of disclosed plural component elements. For example, even when some of components elements are deleted from whole component elements shown in the embodiments, the problems presented for solution by the invention can be solved and effects described in the effects of the invention are obtained, the construction with the component elements deleted can be derived as an invention.

According to the present invention, it is possible to provide a wireless communication apparatus capable of making the wireless communication effectively utilizing the performance of wireless communication media having different communication performances manufactured by various makers and a wireless communication method. Further, wireless communication media to which this communication method is applicable can be provided.

What is claimed is:

1. A wireless communication apparatus for wireless communication with wireless communication media, comprising:

transmitting means for transmitting a response requesting signal to a wireless communication medium;

receiving means for receiving a response transmitted from the wireless communication medium in response to the response requesting signal transmitted by the transmitting means the received response including medium type data indicating the type of wireless communication media;

storage means for storing a plurality of threshold signal levels of received signals for different types of wireless communication media, the respective threshold signal levels being correlated with the medium type data indicating the type of the wireless communication media;

detecting means for detecting a signal level of the received response;

reading means for reading one of the plurality of threshold signal levels from the storage means that corresponds to the medium type data included in the response received by the receiving means;

comparing means for comparing the received response signal level detected by the detecting means with the read threshold signal level read by the reading means; and control means for commencing the writing of specified data to the wireless communication medium, from which the response was transmitted, when the received response signal level is determined by the comparing means to be larger than or equal to the read threshold signal level.

2. The wireless communication apparatus as set forth in claim 1, wherein the control means, retransmits the response request signal by the transmitting means without commencing the writing of the specified data to the wireless communication medium when the received response signal level is less than the read threshold signal level as determined by the comparing means, and commences the writing of the specified data to the wireless communication medium to which the response is transmitted, when the received response signal level received by the receiving means in response to the retransmitted response request signal, is determined by the comparing means to be larger than the corresponding threshold signal level.

3. The wireless communication apparatus as set forth in claim 1, wherein the medium type data includes the name of the manufacturer of the wireless communication media.

4. A wireless communication method, comprising:

transmitting a response requesting signal to a wireless communication medium for requesting a response therefrom, the response requesting signal including a request for medium type data indicating the type of wireless communication medium;

receiving a response transmitted from the wireless communication medium in response to the response requesting signal, the received response including the medium type data;

storing a plurality of threshold signal levels of received signals in a storage means for each type of wireless communication media, wherein the threshold signal levels are correlated with the medium type data indicating the type of the wireless communication media;

detecting a signal level of the received response;

reading one of the plurality of threshold signal levels from the storage means that correspond to the medium type data included in the response received by the receiving means;

comparing the received response signal level with the read threshold signal level; and commencing the writing of specified data to the wireless communication medium, from which the response was transmitted, when the received response signal level is determined to be larger than or equal to the read threshold signal level.

5. The wireless communication method as set forth in claim 4, wherein:

upon determining that the received response signal level is less than the read threshold signal level, retransmitting the response request signal without commencing the writing of the specified data to the wireless communication medium, and upon the received response signal level that is received in response to the retransmitted response request signal is determined to be larger or equal to the read threshold signal level, commencing the writing of the specified data to the wireless communication medium, from which the response was transmitted.

6. A wireless communication medium performing wireless communication with a wireless communication apparatus in accordance with the method of claim 4, comprising:

storage means for storing medium type data;

receiving means for receiving a response request signal to request a response transmitted from the wireless communication apparatus, the response request signal including a request for media type data stored in the storage means; and transmitting means for transmitting a response including the medium type data stored in the storage means to the wireless communication apparatus in response to the response request signal.

7. The wireless communication medium, as set forth in claim 6, wherein the medium type data includes the name of the manufacturer of the wireless communication media.

* * * * *